United States Patent [19]
Hisadomi

[11] Patent Number: 5,996,717
[45] Date of Patent: Dec. 7, 1999

[54] FRAME STRUCTURE FOR A SNOWMOBILE

[75] Inventor: Masaru Hisadomi, Saitama, Japan

[73] Assignee: Honda Giken Kogyo Kabushiki Kaisha, Tokyo, Japan

[21] Appl. No.: 09/015,901

[22] Filed: Jan. 30, 1998

[30] Foreign Application Priority Data

Jan. 31, 1997 [JP] Japan ..................................... 9-019060

[51] Int. Cl.⁶ .......................... B62M 27/02; B62K 11/02; B62K 19/32
[52] U.S. Cl. .......................... 180/182; 180/190; 280/279
[58] Field of Search ................................... 180/182, 183, 180/190, 219, 311; 280/274, 276, 279; 74/551.1, 551.3, 551.4

[56] References Cited

U.S. PATENT DOCUMENTS

| | | | |
|---|---|---|---|
| 2,542,926 | 2/1951 | Jozif et al. | 280/289 |
| 3,388,612 | 6/1968 | Oakley et al. | 74/551.4 |
| 4,690,234 | 9/1987 | Takada | 180/182 |
| 5,284,221 | 2/1994 | Warne | 180/219 |
| 5,380,027 | 1/1995 | Pong et al. | 280/279 |
| 5,570,614 | 11/1996 | Nastrucci | 74/551.1 |
| 5,603,521 | 2/1997 | Bontrager | 280/279 |
| 5,904,217 | 5/1999 | Yamamoto et al. | 180/193 |

FOREIGN PATENT DOCUMENTS

| | | |
|---|---|---|
| 61-163081 | 7/1986 | Japan . |
| 3189289 | 8/1991 | Japan . |
| 405131964A | 5/1993 | Japan . |
| 406191459A | 7/1994 | Japan . |

*Primary Examiner*—J. J. Swann
*Assistant Examiner*—Christopher D Bottorff
*Attorney, Agent, or Firm*—Birch, Stewart, Kolasch & Birch, LLP

[57] ABSTRACT

A frame structure for a snowmobile includes a frame front end member, right and left main frames, and a connecting mechanism. The frame front end member includes a pair of right and left head members, each being formed into a hollow columnar shape, disposed substantially in the vertical direction, and a cross-member connecting the head members to each other. The right and left head members are connected to front end portions of the right and left main frames. The connecting mechanism is tightly secured to the cross-member. An upper end portion of a suspending member for operably suspending a steering member is disposed at a front portion of a snowmobile.

12 Claims, 8 Drawing Sheets

FRAME STRUCTURE FOR A SNOWMOBILE

BACKGROUND OF THE INVENTION

1. Field of the Invention

The present invention relates to a frame structure suitable for a small-sized snowmobile.

2. Description of Related Art

A device for steering and suspending a ski as a steering member disposed at a front portion of a snowmobile is disclosed, for example, in (1) Japanese Patent Laid-Open No. Sho 61-163081, and (2) Japanese Patent Laid-Open No. Hei 3-189289.

The device disclosed in Japanese Patent Laid-Open No. Sho 61-163081 describes a snowmobile of a type including right and left skis, wherein steering arms are fixed to supporting pipes of right and left dampers and are connected to each other by a tie rod. The right and left skis are steered by simultaneously steering the right and left dampers in the same direction, to thus steer the snowmobile.

This technique is suitable for a relatively large sized snowmobile, similar to a small-sized four-wheeled buggy, of a type including a right and left steering skis, in which a frame including a supporting portion of a steering portion is relatively large.

In this snowmobile, a steering shaft is supported not by a frame member but by a stay or the like extending from the frame.

Accordingly, a steering shaft supporting portion must be disposed separately from the frame member, so that the entire frame structure including the steering shaft supporting portion becomes large and complicated and also the number of parts constituting the frame structure is increased. Such a frame structure is not suitable for a small-sized snowmobile.

The device disclosed in Japanese Patent Laid-Open No. Hei 3-189289 describes a small-sized snowmobile of a normal motorcycle using a frame similar to that of a motorcycle, in which one ski is provided on a portion equivalent to a front wheel of a motorcycle and is supported by a front fork.

A steering shaft of the front fork is turnably supported by a head tube having the same front structure of a frame of a normal motorcycle.

In a small-sized snowmobile, the frame structure described in Japanese Patent Laid-Open No. Hei 3-189289 is preferred for reducing the size of the snowmobile. However, for a snowmobile of a type in which a driver operates the snowmobile in a standing state, the frame structure of a motorcycle type in which a head tube is provided at a front end portion has the following problems.

For the snowmobile of the type in which a driver operates the snowmobile in a standing state, it is desired to lower the position of head members for supporting steering arms. In this regard, the structure of Japanese Patent Laid-Open No. Hei 3-189289 is disadvantageous in that the position of the front portion of the frame, particularly, the head tube is lowered so that the suspending member for the ski is close to the head tube. As a result, it becomes difficult to ensure a sufficient stroke of the suspending member and also the head tube may interfere with an engine and the like because of the lowered head tube.

OBJECTS AND SUMMARY OF THE INVENTION

The present invention has been made to solve the problem of the above-described frame structure of a motorcycle type for the purpose of further reducing the size of a small-sized snowmobile of a type in which a driver operates the snowmobile in a standing state.

The present inventor has found that the above problem can be solved by functionally dividing a head tube for supporting a steering shaft and right and left main frame members into a main frame member supporting portion and a steering shaft supporting portion, disposing the steering shaft supporting portion between the right and left main frame members, and integrating the main frame member supporting portion with the steering shaft supporting portion.

Accordingly, an object of the present invention is to provide a frame structure for a snowmobile or the like using a frame structure similar to the so-called head tube, which is capable of lowering the height of a frame front end portion, obtaining a steering shaft supporting structure comparative to that of the head tube and suitable for a standing type snowmobile, further reducing the size of the snowmobile, and simplifying the frame structure.

To achieve the above object, according to the present invention, there is provided a frame structure for a snowmobile or the like, including: a frame front end member including a pair of right and left head members, each being formed into a hollow columnar shape, disposed substantially in the vertical direction, and a cross-member connecting the head members to each other. Right and left main frames with front end portions thereof are connected to the right and left head members. A holding block connecting mechanism is provided for tightly holding, to the cross-member, an upper end portion of a suspending member for operably suspending a steering member disposed at a front portion of the snowmobile or the like.

In the present invention, since the frame front end member is composed of the right and left head members and the cross-member for connecting both the head members to each other, and the main frame members are supported by the right and left head members while the steering shaft is supported by the cross-member, the head members can be disposed at a position being as low as possible and the steering shaft supporting portion can be at a height required in terms of the function. Thus, it is possible to lower the position of the frame front end portion while ensuring the steering performance and to lower the frame front end portion without interference with an engine and the like.

Accordingly, there can be obtained a frame structure most suitable, in terms of steering performance and arrangement of an engine and the like, for a standing type snowmobile in which it is desired to dispose a frame front portion at a low position.

According to the present invention, the frame front end member is formed by extrusion, and a hollow portion of each of the right and left head members contains a rib connected thereto in such a manner so as to cross an internal space of the hollow portion.

According to the present invention, since each of the right and left head members is formed into a hollow columnar shape and a rib is contained in an inner space of the hollow portion, it can be easily cast by extrusion using aluminum or the like. The head member has a high rigidity by the presence of the rib, which is suitable as the frame front end member.

According to the present invention, boss portions for supporting steering arms are provided on upper portions of the right and left head members.

The present invention is suitable for a standing type snowmobile in which a handle is desired to be rockable in the vertical direction. To be more specific, in this invention, the right and left steering arms of the handle are vertically rockably supported on the supporting boss portions provided on the upper portions of the right and left head members, and further, it is not required to additionally provide a supporting member on the frame for supporting the steering arms. As a result, it is possible to simplify the supporting structure, and to reduce the number of parts constituting the supporting structure.

According to the present invention, a joint supporting member for transmitting a steering action of a handle to a steering shaft of the suspending member is provided on the holding block connecting mechanism for tightly holding the upper end portion of the suspending member.

According to the present invention, since the supporting member of a joint connected to the handle for rotating and steering the steering member, more securely, the steering shaft of the suspending member for a ski of a snowmobile is disposed in the tight holding mechanism, the joint supporting member is disposed in a space between the right and left head members and the pivot of the joint on the supporting member can be close to the right and left steering arm supporting portions on the right and left head members. As a result, vertical turning of the steering arm supporting portions and flexible action of the joint can both be smoothly performed. This is desirable in terms of the operation of the handle.

According to the present invention, part of the joint supporting member is prevented from being slipped off by the right and left head members. In addition, according to the present invention, part of the joint supporting member is locked in a groove formed in part of the right and left head members in such a manner so as to be prevented from being slipped-off, and accordingly, even if a force is applied to the joint supporting member in the upward direction upon operation of the handle, the force is received by the slip-off preventive portion, to thereby positively support the joint supporting member.

According to the present invention, steering arm supporting boss portions are provided on upper portions of the right and left head members; leading end portions of right and left steering arms are vertically rockably supported by the boss portions; a connecting rod for steering is disposed between the right and left steering arms; a leading end portion of the connecting rod for steering is connected to a joint supported on a joint supporting member disposed between the right and left head members; and a supporting shaft for connecting the joint to the leading end portion of the connecting rod, and supporting shafts of the steering arms are aligned substantially in line in a side view.

In the present invention, the rocking supporting shafts for the right and left steering arms and a supporting shaft for connecting the joint to the leading end of the connecting rod are aligned substantially in a line. As a result, the vertically rocking fulcrums of the steering arms are substantially aligned with the supporting shaft as a bending fulcrum at the leading end portion of the connecting rod disposed between the steering arms and are substantially in parallel thereto. Accordingly, the flexibly rocking motion of the joint can smoothly follow the vertical rocking motion of the steering arms. Further, the flexibly rocking motion of the connecting rod can smoothly follow the vertical rocking motion of the steering arms.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the present invention will be described with reference to the accompanying drawings.

Figure 6:
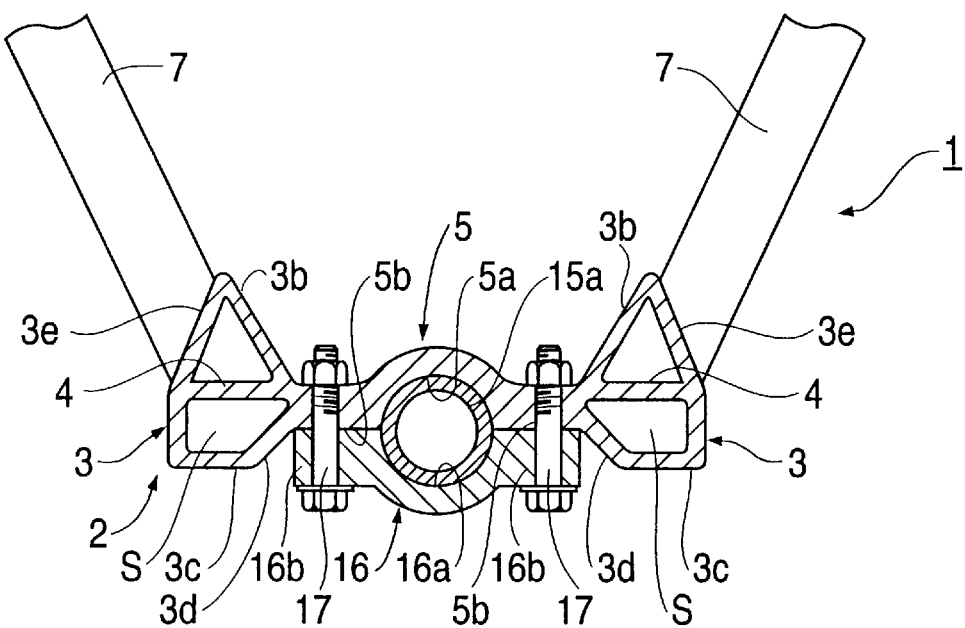
FIG. 6 is a sectional view taken on line 6—6 of FIG. 5, including a mechanism for tightly holding a steering shaft.

A frame 1 includes at a front end portion thereof a frame front end member 2. The front end member 2 includes two head members 3 disposed separately from each other on the right and the left. The head member 3 extends substantially in the vertical direction, and as shown in FIG. 6, it is formed into a hollow columnar shape.

In this embodiment, the head member 3 is formed in the hollow columnar shape and has a cross-section of an angled shape. More specifically, an approximately pentagonal shape is provided in a region from an upper side of an intermediate portion to a lower half. To be more specific, the head member 3 includes on the rear side thereof a projecting portion 3b having an acute portion directed rearwardly, and it also includes on the front side thereof a portion projecting in a reversed U-shape which internally forms a space S. A rib 4 which is formed to the right and left is provided in the space S in such a manner as to be connected integrally with an inner wall of the hollow portion of the head member 3. The space S is divided by the rib 4 into a rear hollow portion having an approximately triangular shape and a front hollow portion having a rectangular shape.

The above rearwardly projecting portion 3b is not provided for an upper portion 3a of the head member 3. Accordingly, the rib 4 is exposed as a rear wall of the upper portion 3a. The upper portion 3a has an approximately rectangular hollow shape.

The head members 3 are disposed symmetrically on the right and the left. Inner sides 3d of the front portions 3c of the head members 3 are symmetrically tilted inwardly and rearwardly.

Between inner sides of the right and left head members 3 is provided a cross-member 5 for connecting both the head members 3 to each other. The cross-member 5 is disposed between the right and left head members 3 in such a manner so as to extend vertically in a region from an intermediate portion to a lower portion of each head member 3. A spacing between upper half portions of the head members 3 is opened in the longitudinal direction and also in the upward direction.

An intermediate portion of the cross-member 5 in the lateral direction has a recessed portion 5a. The recessed portion 5a, which is recessed rearwardly, extends in the vertical direction. A front surface of the recessed portion has a semi-circular shape. Flat-shaped mounting seats 5b are formed on the right and left sides of the recessed portion 5a.

The above right and left head members 3 (including the ribs 4) and the cross-member 5 are integrally cast by extrusion using a light alloy such as aluminum, to thus form the front end member 2. It becomes apparent that the front end member 2 can be easily cast by extrusion from the viewpoint of its cross-section.

Supporting boss portions 6 for supporting right and left steering arms 18a of a handle 18 (described later) are provided on upper end portions of the head members 3 of the front end member 2 thus cast by extrusion.

Each supporting boss portion 6 has a base 6a provided on a base portion thereof. The base 6a is joined integrally to an upper end portion of the head member 3 by welding. The angled boss portion 6, which is erected on the base 6a, has a mounting hole 6b passing through the boss portion 6 on the right and the left.

Figure 3:
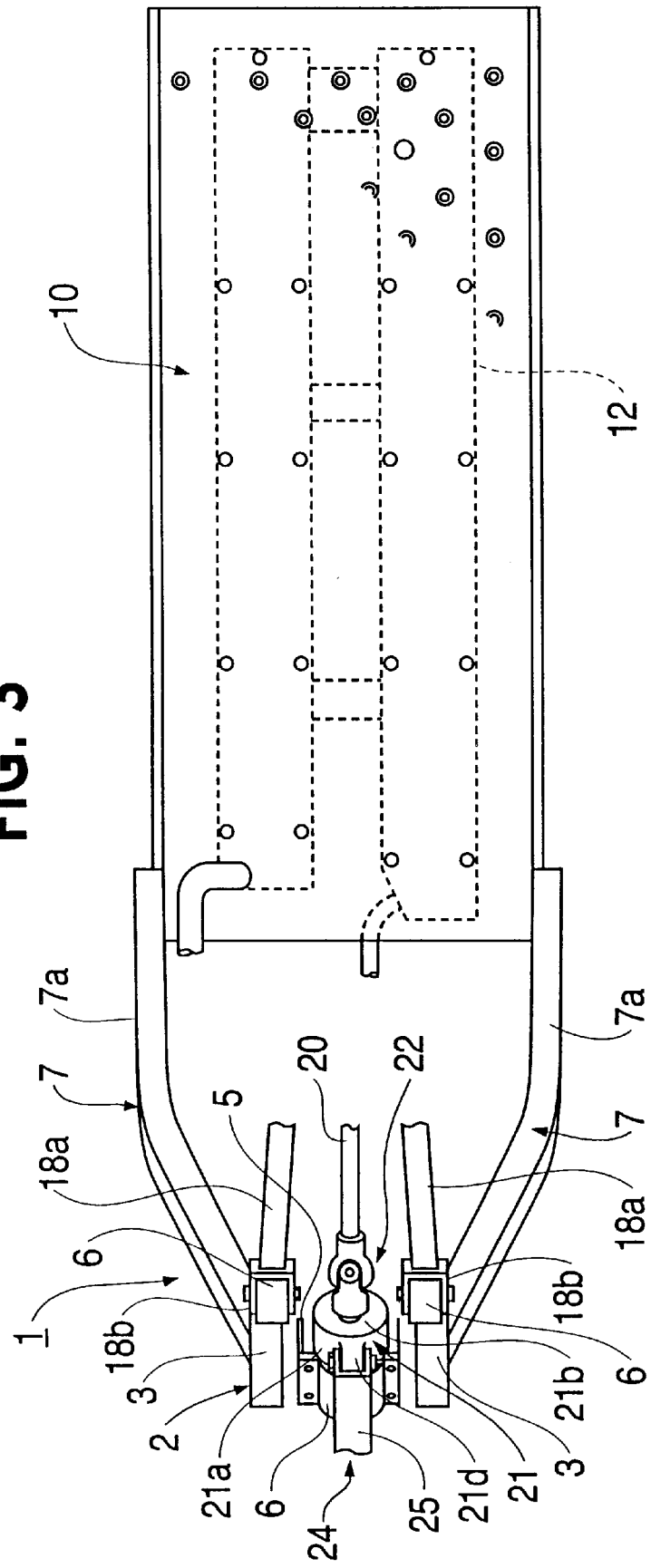
FIG. 3 is plan view of a frame.
Figure 4:
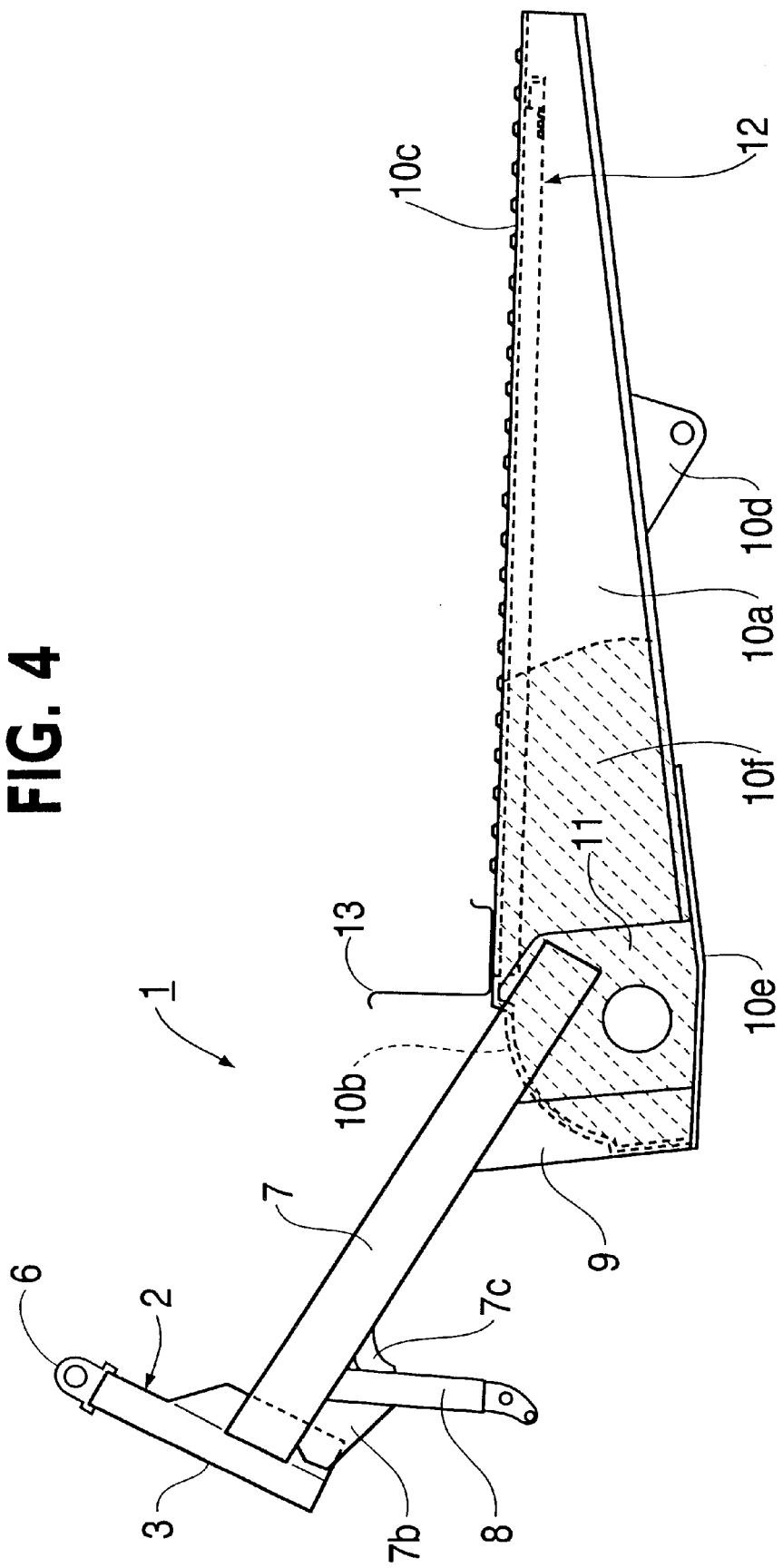
FIG. 4 is side view of the frame.
Figure 5:
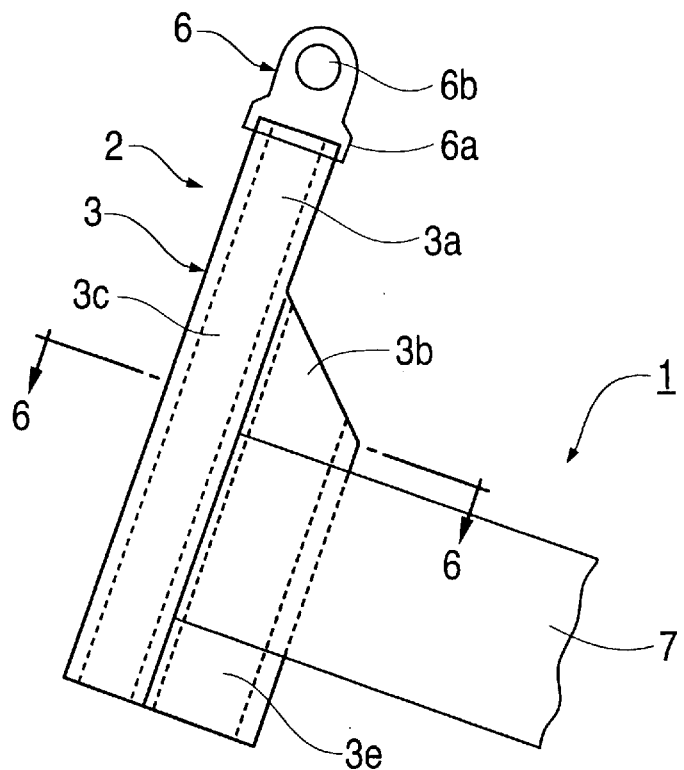
FIG. 5 is an enlarged side view of a front end portion of the frame, showing only a frame portion in a state in which a steering mechanism is removed.

On the other hand, front end portions of the right and left main frames 7 are cut obliquely and joined by welding to lower side portions of the intermediate portions of the right and left head members 3, and are secured to outer side portions 3e of the rear projecting portions 3b. An angular pipe made from the same material as that of the head member 3 is used as the main frame member 7. Referring to FIGS. 3 and 4 showing the entire structure of the frame 1, a spacing between the main frame members 7 is narrow at the front side and becomes wider towards the rearward side. In a region from the intermediate point to the rear side, the right and left main frame members 7a are substantially in parallel to each other. As shown in FIG. 4, the main frame member 7 is tilted downwardly and rearwardly.

A front engine hanger 8 is suspended from the front portion of each main frame member 7 through gussets 7b and 7c, and a rear engine hanger 9 is suspended from the rear portion of the main frame member 7.

A front portion of each side piece 10a of the floor 10 having a reversed U-shape in cross-section is jointed integrally to the rear portion of each main frame member 7 through a gusset 11. A cross-plate 10b is provided at a front portion of the floor 10 for reinforcing the floor 10. A heat exchanger 12 is integrally jointed to a lower surface of a floor portion 10c of the floor 10 for increasing the rigidity and strength of the floor 10.

In FIG. 4, a floating ring supporting bracket 10d of a track belt mechanism for driving the snowmobile (described later) is provided. A battery holder 13 and a cross-plate 10e are provided on a lower surface of the front portion of the floor 10, lower surface of the gusset 11, and lower surface of the rear engine hanger 9.

Reinforcing plates 10f are provided as lining plates inside the right and left side pieces 10a of the floor 10 in a region from an inner side portion of the rear engine hanger 9 to a mounting boss portion of a damper 36 for the track belt mechanism 35 (described later) for reinforcing such a region.

In addition, the reinforcing plate 10f is disposed inside each of the right and left side pieces 10a.

Figure 9:
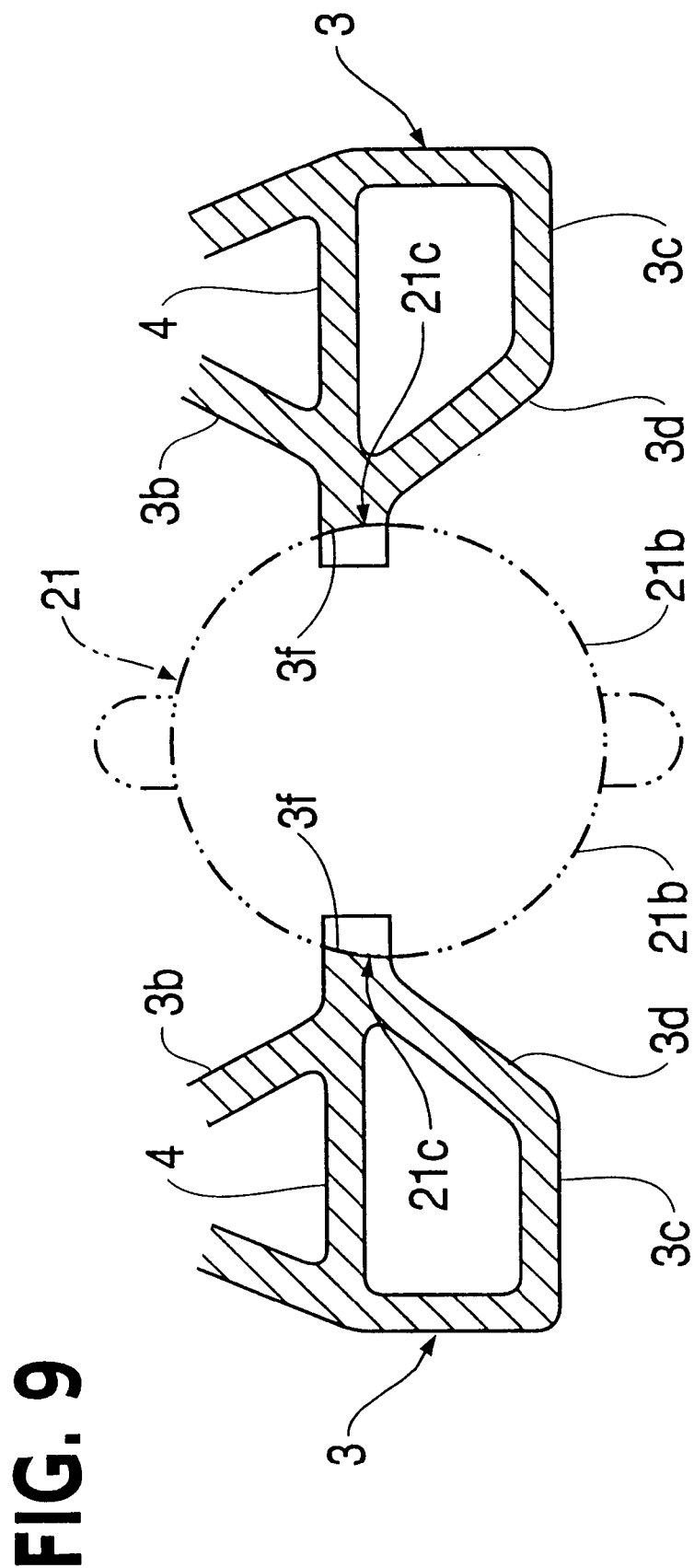
FIG. 9 is an enlarged plan view showing a portion for preventing slip-off of a joint supporting member.

As shown in FIG. 9, the inner side portions 3d, oppositely tilted, of the upper half portions 3a of the right and left head members 3 are partially cut out to symmetrically form groove-like recessed portions 3f which are recessed outwardly. The recessed portions 3f are engaged with part of an outer peripheral portion of a disk-like supporting portion 21b of a joint supporting member 21 (described later), to thus constitute a slip-off preventive mechanism. In order to be engaged with part of a circular-arc of the disk-like supporting portion 21b, the recessed portions 3f correspondingly form part of a circular-arc in a plan view.

A supporting shaft of a suspending member 15 for operably supporting one ski 14 is tightly held and fixed in the recessed portion 5a of the cross-member 5 between the right and left head members 3 of the frame front end member 2.

To be more specific, the suspending member 15 shown in FIG. 6 is composed of, for example, a fixed inner tube 15a, and an outer tube 15b which is fitted around the inner tube 15a and exhibits a damping function by a vertical stroke. The outer tube 15b is turnably moved relative to the inner tube 15a for allowing a steering operation.

A rear half of an outer periphery of an upper portion of the inner tube 15a is engaged in the recessed portion 5a and is covered with a holding block 16 from the outside (front surface side). Then, right and left flat portions 16b of the holding block 16 are abutted on the flat portions 5b on both of the sides of the recessed portion 5a. A recessed portion 16a of an intermediate portion of the holding block 16 is engaged around a front half of the upper portion of the inner tube 15a. Bolts 17 pass through both the flat portions 5b and 16b in the longitudinal direction and are fastened to tightly hold the upper end portion of the inner tube 5a.

The supporting shaft of the suspending member 15 is thus fixed to the cross-member 5 provided between the head members 3 by the tightly holding mechanism.

In this way, the upper supporting portion of the suspending member 15, that is, the upper portion of the inner tube 15a is tightly held and fixed to the cross-member 5 between the right and left head members 3 through the holding block 16, while the turnable lower half of the suspending member 15, that is, the lower end portion of the outer tube 15b is provided with the ski 14 which is turnable around a supporting shaft 14a. As a result, the snowmobile can follow a rolling snow surface by the turning of the ski 14 around the supporting shaft 14a.

The handle 18 is disposed rearwardly and upwardly of the frame front end member 2. The handle 18 includes right and left steering arms 18a, and stays 18b each being formed into a reversed U-shape and formed at leading ends of the arms 18a. The stay 18b is placed on the supporting portion 6 in such a manner that the supporting portion 6 is held between the U-shaped side portions of the stay 18b. Then, a supporting shaft 18c (represented by a bolt) is made to pass through the U-shaped side portions of the stay 18b and the supporting portion 6. Thus, the arm 18a is vertically turnable around the supporting shaft 18c at the leading end of the arm 18a.

An upper end of the handle 18 includes a handlebar 19 extending to the right and left. A steering operation is performed by the driver who holds the grips disposed at both ends of the handlebar 19. A spacing between upper end portions of the right and left steering arms 18a is narrow, and a supporting boss portion 18d is provided on the upper end portions of the arms 18a. A steering shaft is disposed at a base portion of the handlebar 19 and is made to pass through the supporting boss portion 18d and is connected to an upper portion of a connecting rod 20 for steering.

The connecting rod 20 for steering, which is positioned between the right and left steering arms 18a, extends forwardly and downwardly.

On the other hand, an upper end portion 15c of the inner tube 15a of the supporting shaft, tightly held between the cross-member 4 and the holding block 16 between the head members 3, projects from the holding block 16 around which a cylindrical joint supporting member 21 is turnably fitted. A disk-like joint supporting portion 21b is fixed on an upper end portion of a cylinder portion 21a of the supporting member 21.

A lower half 22b of a universal joint 22 is erected on the joint supporting portion 21b, and an upper half 22a of the universal joint 22 is provided on a leading end portion (lower end portion) of the connecting rod 20. The upper half 22a is pivotably mounted to the lower half 22b with a supporting shaft 22c.

Figure 7:
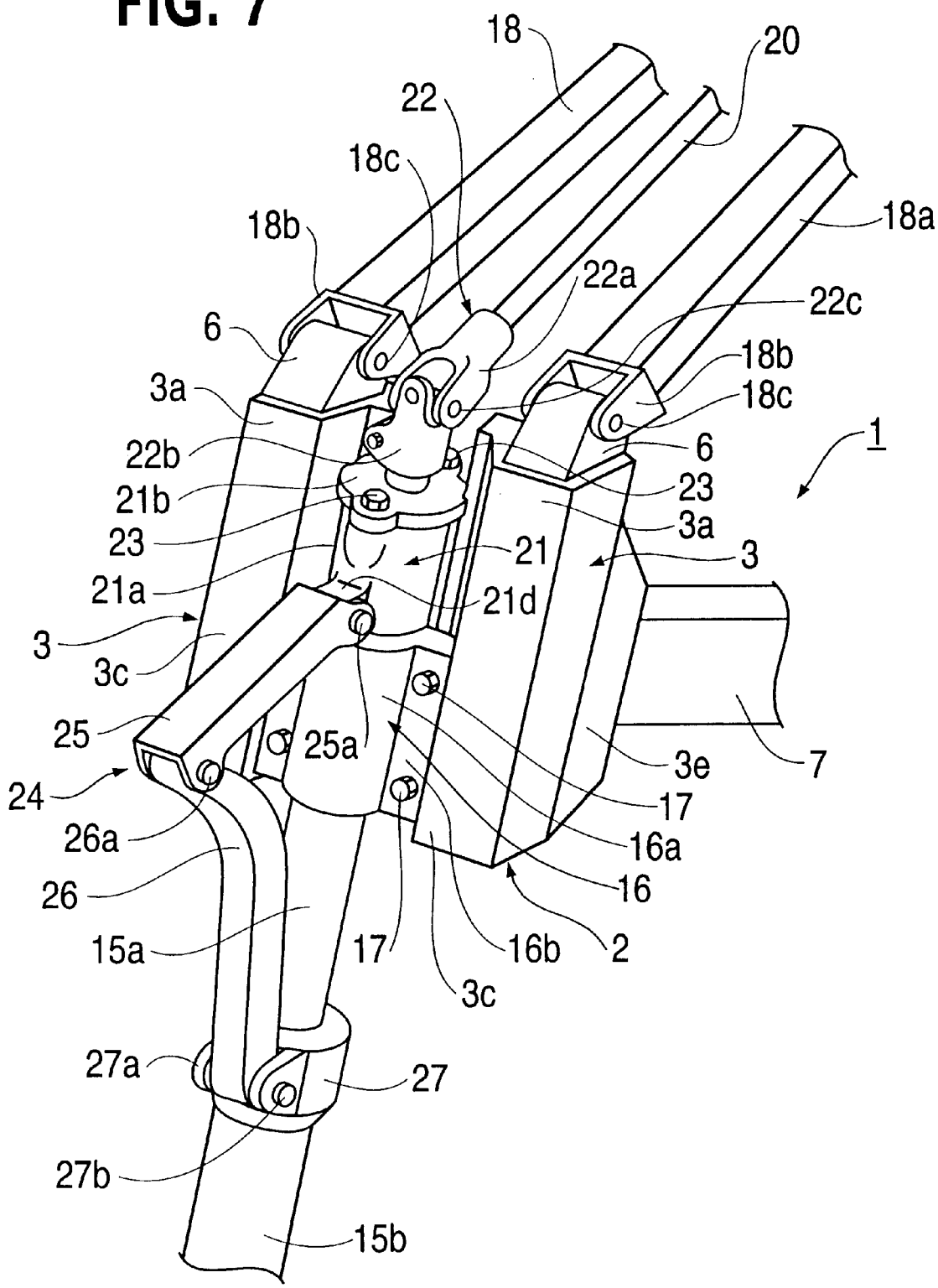
FIG. 7 is a perspective view of a front portion of the frame, including the steering mechanism.
Figure 8:
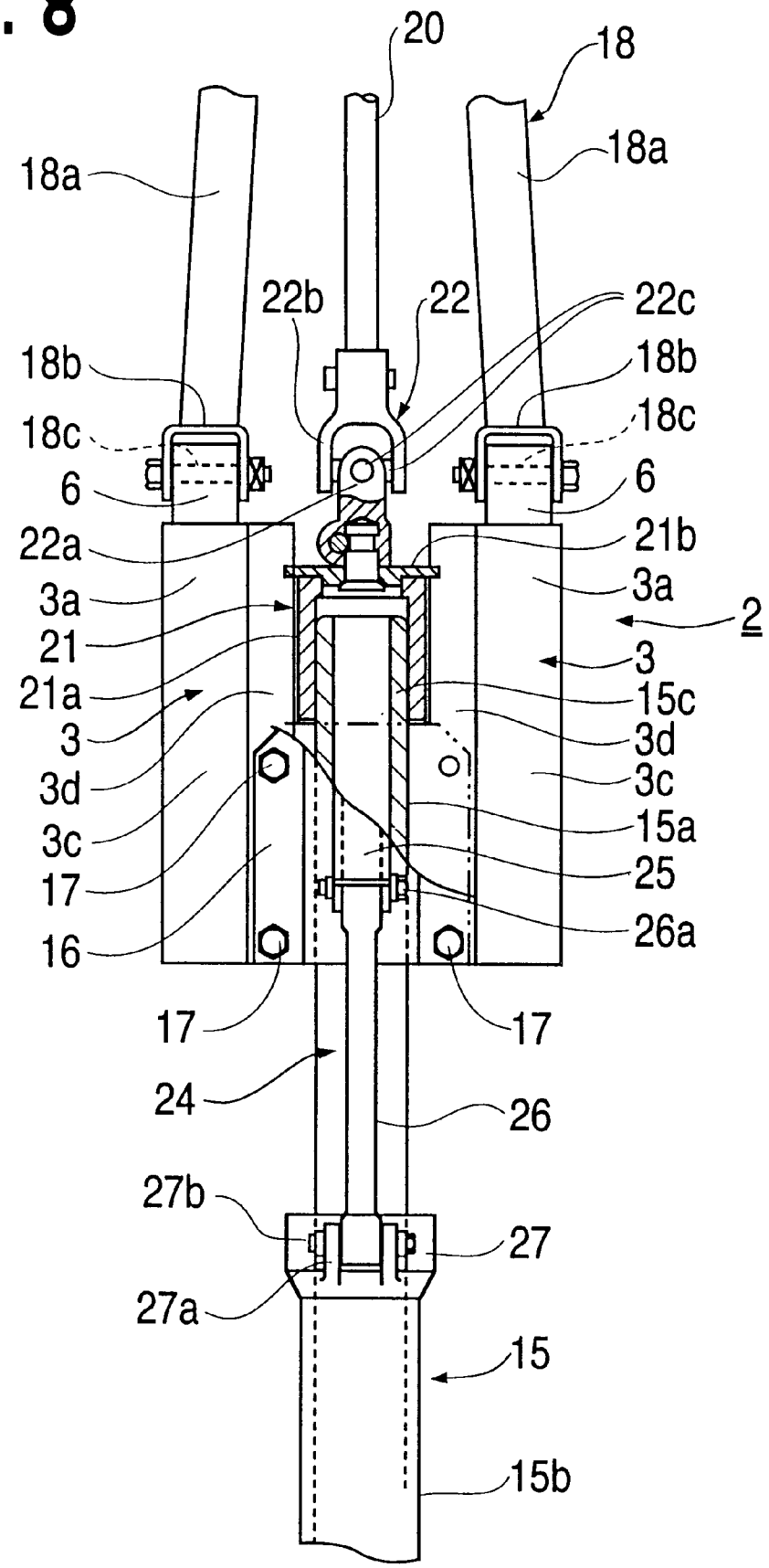
FIG. 8 is a vertical sectional front view of FIG. 7.

The disk-like joint supporting portion 21b is integrally connected to the lower cylinder portion 21a with bolts 23, as shown in FIG. 7. Incidentally, the supporting shaft 22c which passes through both the lower half 22b and the upper half 22a of the universal joint 22, is substantially aligned (in a side view) with the supporting shafts 18c which pass through the leading ends of the right and left steering arms 18a pivotably mounted on the supporting portions 6 erected on the right and left head members 3. That is, the supporting shafts 18c and 22c are disposed such that axial lines thereof are substantially equal to or close to each other.

With this arrangement, the rocking fulcrums of the steering arms 18a are substantially aligned with the supporting shaft 22c which is a bending fulcrum of the universal joint 22 disposed at the leading end portion of the connecting rod 20 disposed between the steering arms 18a and are substantially in parallel thereto. Accordingly, the universal joint 22 can smoothly follow the vertical rocking motion of the steering arms 18a.

With respect to the disk-like supporting portion 21b provided at the upper end portion of the joint supporting member 21, right and left rear portions 21c of a circular-arc of a rear half of the supporting portion 21b are fitted in the recessed portions 3f formed at the inner side portions 3d of the right and left head members 3.

The groove-like recessed portions 3f vertically hold the rear portions 21c of the disk-like joint supporting portion 21b for preventing upward floating of the disk-like joint supporting portion 21b even if the supporting portion 21b is applied with a load in the upward direction.

The joint supporting member 21 is, as described above, turnably fitted on the upper end portion 15c of the inner tube 15a tightly held between the cross-member 4 disposed between the head members 3 and the holding block 16, and a mounting boss portion 21d of a link mechanism 24 is provided on a front surface of the cylinder portion 21a of the joint supporting member 21.

The link mechanism 24 is composed of an upper link 25 and a lower link 26. An upper end portion of the upper link 25 is pivotally supported on the mounting boss portion 21d through a supporting shaft 25a. A lower end portion of the upper link 25 and an upper end portion of the lower link 26 are pivotably connected to each other by a supporting shaft 26a.

A lower end portion of the lower link 26 is pivotably supported by a shaft 27b on a forked mounting portion 27a of a mounting boss portion 27 provided on the upper end portion of the outer tube 15b.

Upon a stroke of the outer tube 15b of the suspending member 15, a variation in the stroke is absorbed by vertical and longitudinal movement of the link mechanism 24 through flexible motions of the upper link 25 and the lower link 26.

On the other hand, the vertical movement of the steering arms 18a of the handle 18 is absorbed by the universal joint 22. The steering operation of the handlebar 19 in the lateral direction is transmitted to the supporting member 21 through the joint 22 by the steering rod 20. At this time, since the cylinder portion 21a of the supporting member 21 is rotatably fitted around and supported by the upper end portion 15c of the inner tube 15a, the supporting member 21 is turned around the cylinder portion 21a.

As a result, the link mechanism 24 is turned integrally with the cylinder portion 21a, and the outer tube 15b constituting the steering member is turned around the inner tube 15a, thus allowing the steering operation of the ski 14 on the basis of the steering operation of the handlebar 19.

The schematic configuration of a snowmobile 30 having the above frame structure will be described with reference to FIGS. 1 and 2. An engine 31, which is positioned behind and under the head members 3, is supported by the above-described front and rear engine hangers 8 and 9. A fuel tank 32 is disposed on the engine 31. A carburetor 33 constituting a fuel supply device is disposed rearwardly of the engine 31, and an air cleaner 34 is disposed sideward of the carburetor 33.

The track belt mechanism 35 for driving is disposed under the floor 10, and it includes a swing arm type frame 35a, a drive wheel 35b, a driven wheel 35c, upper and lower floating rings 35d, a belt 35e, and a damper 36 and a suspension spring 37 interposed between the frame 35a and the floor 10.

An exhaust expansion chamber 38 projecting forwardly in an arcuate shape in a plan view and a muffler 39 are disposed on lower and upper sides in front of the head members 3. The link mechanism 24 moved in the longitudinal direction is contained in a recessed portion which is recessed forwardly and which is surrounded by the expansion chamber 38 and the muffler 39. For the enhanced external appearance, the portion extending from the front side to the rear side of an intermediate portion is covered with a cowling 40.

Figure 1:
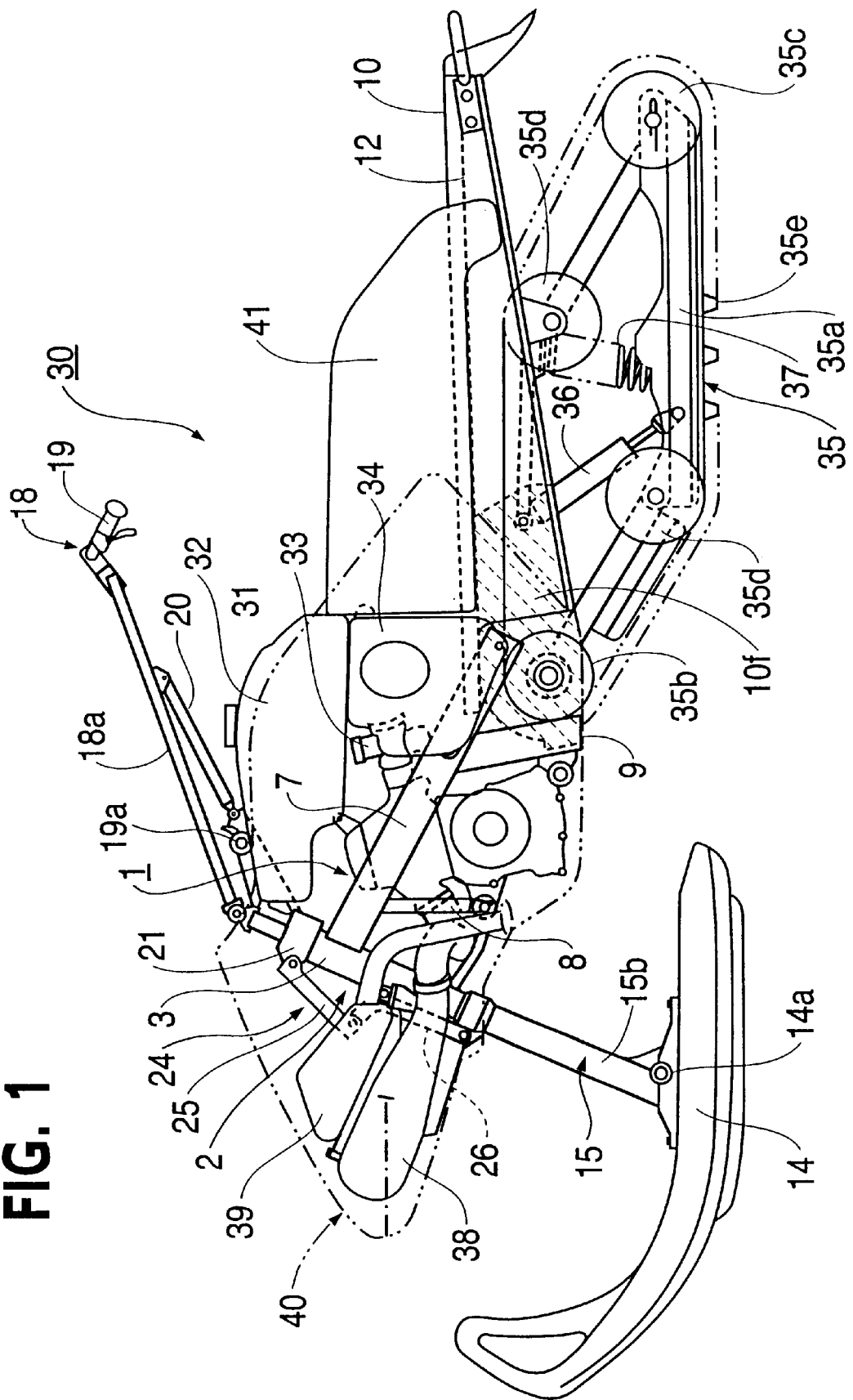
FIG. 1 is a side view showing a schematic configuration of a snowmobile.
Figure 2:
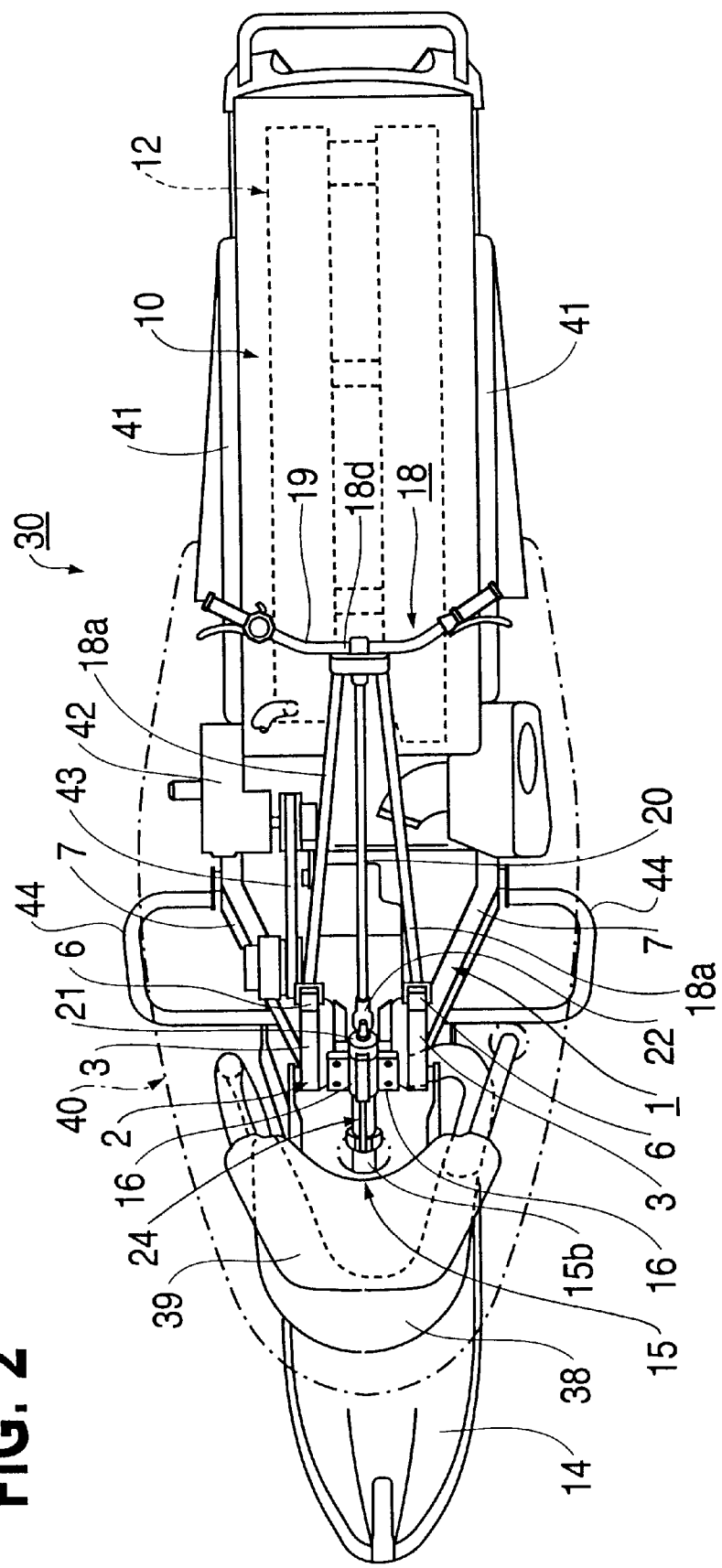
FIG. 2 is plan view of FIG. 1.

In FIGS. 1 and 2, a side guard plate 41 is provided together with a gear case 42 and a belt mechanism 43 for transmitting an engine output to a gear case and the drive wheel 35b. A guard pipe 44 is provided outside the main frames 7. In FIGS. 1, a choke operating lever 19a is provided for starting the snowmobile.

In the present invention a frame structure for a snowmobile or the like is provided which includes a frame front end member having a pair of right and left head members, each being formed into a hollow columnar shape, disposed substantially in the vertical direction, and a cross-member connecting the head members to each other. Right and left main frames are provided with front end portions thereof connected to the right and left head members. A connecting mechanism is provided for tightly holding to the cross-member, an upper end portion of a suspending member for operably suspending a steering member is disposed at a front portion of the snowmobile or the like. As a result, since the frame front end member is composed of the right and left head members and the cross-member for connecting both the head members to each other, and the main frame members are supported by the right and left head members while the steering shaft is supported by the cross-member, the head members can be disposed at a position which is as low as possible.

In particular, since the steering shaft supporting portion is disposed between the right and left head members for mounting the right and left main frame members, the steering shaft supporting portion can be at a height required in terms of the function thereof. Thus, it is possible to lower the position of the frame front end portion while ensuring the steering performance and to lower the frame front end portion without interference with an engine and the like.

Accordingly, there can be obtained a frame structure most suitable, in terms of steering performance and arrangement of an engine and the like, for a standing type snowmobile in which it is desired to dispose a frame front portion at a low position.

Further, according to the present invention, since the basic structure is similar to a frame structure of a motorcycle type, the entire frame structure is simple.

According to the present invention, the frame front end member is formed by extrusion, and a hollow portion of each of the right and left head members contains a rib connected thereto in such a manner as to cross an internal space of the hollow portion. As a result, since each of the right and left head members is formed into a hollow columnar shape and a rib is contained in an inner space of the hollow portion, it can be easily cast by extrusion using aluminum or the like. The head member has a high rigidity by the presence of the rib, which is suitable as the frame front end member.

According to the present invention, boss portions for supporting steering arms are provided on upper portions of the right and left head members. This is suitable for a standing type snowmobile in which a handle is desired to be rockable in the vertical direction. To be more specific, in this invention, the right and left steering arms of the handle are vertically rockably supported on the supporting boss portions provided on the upper portions of the right and left head members. Further, it is not required to additionally provide a supporting member on the frame for supporting the steering arms. As a result, it is possible to simplify the supporting structure, and to reduce the number of parts constituting the supporting structure.

According to the present invention, a joint supporting member for transmitting a steering action of a handle to a steering shaft of the suspending member is provided on the connecting mechanism for tightly holding the upper end portion of the suspending member. With this configuration, since the supporting member of a joint is connected to the handle for rotating and steering the steering member, more securely, the steering shaft of the suspending member for a ski of a snow mobile is disposed in the tight holding mechanism, the joint supporting member is disposed in a space between the right and left head members, that is, it does not project forward from the head members. This is advantageous in terms of the protection of the mechanism. Further, the pivot of the joint on the supporting member can be close to the right and left steering arm supporting portions on the right and left head members. As a result, vertical turning of the steering arm supporting portions and flexible action of the joint can be both smoothly performed. This is desirable in terms of the operation of the handle.

According to the present invention, part of the joint supporting member is prevented from being slipped off by the right and left head members. With this configuration, part of the joint supporting member is locked in a groove formed in part of the right and left head members in such a manner as to be prevented from being slipped-off. Accordingly, even if a force is applied to the joint supporting member in the upward direction upon operation of the handle or upon stroke of the suspending member, the force is received by the slip-off preventive portion, to thereby positively support the joint supporting member.

According to the present invention, steering arm supporting boss portions are provided on upper portions of the right and left head members. Leading end portions of the right and left steering arms are vertically rockably supported by the boss portions. A connecting rod is disposed for steering between the right and left steering arms. A leading end portion of the connecting rod for steering is connected to a joint supported on a joint supporting member disposed between the right and left head members. A supporting shaft is provided for connecting the joint to the leading end portion of the connecting rod. Supporting shafts of the steering arms are aligned substantially in a line in a side view. With this configuration, the rocking supporting shafts for the right and left steering arms and a supporting shaft for connecting the joint to the leading end of the connecting rod are aligned substantially in line. As a result, the vertically rocking fulcrums of the steering arms are substantially aligned with the supporting shaft as a bending fulcrum at the leading end portion of the connecting rod disposed between the steering arms and are substantially in parallel thereto. Accordingly, the flexible rocking motion of the joint can smoothly follow the vertical rocking motion of the steering arms. Further, the flexible rocking motion of the connecting rod can smoothly follow the vertical rocking motion of the steering arms The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A frame structure for a snowmobile comprising:
   a frame front end member including a pair of right and left head members, each being formed into a hollow columnar shape, disposed substantially in a vertical direction;
   a cross-member connecting said head members to each other;
   right and left main frames include front end portions connected to said right and left head members; and
   a holding block connecting mechanism for tightly holding, to said cross-member, an upper end portion of a suspending member for operably suspending a steering member disposed at a front portion of said snowmobile.

2. The frame structure for a snowmobile according to claim 1, wherein said frame front end member is formed by extrusion, and a hollow portion of each of said right and left head members contains a rib connected across an internal space of said hollow portion.

3. The frame structure for a snowmobile according to claim 1, wherein boss portions for supporting steering arms are provided on upper portions of said right and left head members.

4. The frame structure for a snowmobile according to claim 1, and further including a joint supporting member for transmitting a steering action of a handle to a steering shaft of said suspending member being provided on said holding block connecting mechanism mounted on said upper end portion of said suspending member.

5. The frame structure for a snowmobile according to claim 4, wherein said joint supporting member is prevented from slipping off by means of said right and left head members.

6. The frame structure for a snowmobile according to claim 1, and further including steering arm supporting boss portions mounted on upper portions of said right and left head members; leading end portions of right and left steering arms being vertically rockably supported by said boss portions; a connecting rod for steering being disposed between said right and left steering arms; a leading end portion of said connecting rod for steering is connected to a joint supported on a joint supporting member disposed between said right and left head members; and a supporting shaft for connecting said joint to the leading end portion of said connecting rod, and supporting shafts of said steering arms are aligned substantially in line in a side view.

7. A frame structure for a snowmobile comprising:
   a suspending member mounted in a forward section of said snowmobile, said suspending member including an upper end portion and a lower end portion;
   a pair of right and left head members being adapted to be secured to said suspending member;
   a cross-member connecting said left and right head members to each other;
   a right main frame including a front end portion connected to said right head member;
   a left main frame including a front end portion connected to said left head member;
   a holding block connecting mechanism for securing to said cross-member for mounting the right and left head members to the upper end portion of the suspending member for operably mounting the right and left main frame members to the suspending member; and
   a steering member disposed at a front portion of said snowmobile and being operably mounted on said suspending member.

8. The frame structure for a snowmobile according to claim 7, wherein said right and left head members are extruded into a hollow columnar shape, and a hollow portion of each of said right and left head members contains a rib connected across an internal space of said hollow portion.

9. The frame structure for a snowmobile according to claim 7, wherein boss portions for supporting steering arms are provided on upper portions of said right and left head members.

10. The frame structure for a snowmobile according to claim 7, and further including a joint supporting member for transmitting a steering action of a handle to a steering shaft of said suspending member is operatively mounted on said holding block connecting mechanism on said upper end portion of said suspending member.

11. The frame structure for a snowmobile according to claim 10, wherein said joint supporting member is prevented from slipping off by means of said right and left head members.

12. The frame structure for a snowmobile according to claim 7, and further including steering arm supporting boss portions mounted on upper portions of said right and left head members; leading end portions of right and left steering arms being vertically rockably supported by said boss portions; a connecting rod for steering being disposed between said right and left steering arms; a leading end portion of said connecting rod for steering is connected to a joint supported on a joint supporting member disposed between said right and left head members; and a supporting shaft for connecting said joint to the leading end portion of said connecting rod, and supporting shafts of said steering arms are aligned substantially in line in a side view.

* * * * *